(12) United States Patent
Kawabe et al.

(10) Patent No.: US 10,870,431 B2
(45) Date of Patent: Dec. 22, 2020

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Koji Kawabe, Wako (JP); Hiroshi Miura, Wako (JP); Makoto Ishikawa, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/190,186

(22) Filed: Nov. 14, 2018

(65) Prior Publication Data
US 2019/0161087 A1      May 30, 2019

(30) Foreign Application Priority Data

Nov. 27, 2017 (JP) .................................. 2017-226774

(51) Int. Cl.
*B60W 40/02* (2006.01)
*B60W 10/04* (2006.01)
(Continued)

(52) U.S. Cl.
CPC ............ *B60W 40/02* (2013.01); *B60W 10/04* (2013.01); *B60W 10/20* (2013.01); *B60W 30/02* (2013.01);
(Continued)

(58) Field of Classification Search
USPC .......................................................... 701/41
See application file for complete search history.

(56) References Cited

U.S. PATENT DOCUMENTS 5,926,126 A * 7/1999 Engelman ............. B60W 30/16
342/70
6,343,869 B1 * 2/2002 Kobayashi ............. B60Q 1/085
362/37
(Continued)

FOREIGN PATENT DOCUMENTS

CN       107844796 A  *  9/2016
GB         2556657 A  *  6/2018  ............ B60W 40/06
(Continued)

OTHER PUBLICATIONS

Japanese Office Action for Japanese Patent Application No. 2017-226774 dated Jun. 25, 2019.

*Primary Examiner* — Jean Paul Cass
(74) *Attorney, Agent, or Firm* — Amin, Turocy & Watson, LLP

(57) ABSTRACT

A vehicle control device includes an imaging unit that images surroundings of an own-vehicle, a detector that detects a state of an external appearance of an oncoming vehicle facing the own-vehicle in a tunnel on the basis of an image captured by the imaging unit, and a determiner that determines whether or not the state of the external appearance of the oncoming vehicle satisfies a predetermined condition on the basis of the state of the external appearance of the oncoming vehicle detected by the detector and determines that the outside of the tunnel toward which the own-vehicle is traveling has bad weather if the state of the external appearance of the oncoming vehicle satisfies the predetermined condition.

7 Claims, 14 Drawing Sheets

(51) Int. Cl.
*B60W 10/20* (2006.01)
*B60W 30/02* (2012.01)
*B60W 30/09* (2012.01)
*B60W 30/18* (2012.01)

(52) U.S. Cl.
CPC ....... *B60W 30/09* (2013.01); *B60W 30/18163* (2013.01); *B60W 2420/42* (2013.01); *B60W 2552/00* (2020.02); *B60W 2555/20* (2020.02); *B60W 2710/20* (2013.01); *B60W 2720/106* (2013.01)

(56) References Cited

U.S. PATENT DOCUMENTS

| | | | | |
|---|---|---|---|---|
| 6,587,573 B1* | 7/2003 | Stam | ...................... | B60Q 1/085 340/930 |
| 6,614,015 B1* | 9/2003 | Ba | ........................ | B60S 1/0822 250/216 |
| 10,203,699 B1* | 2/2019 | Kim | ................ | G08G 1/096725 |
| 2003/0138131 A1* | 7/2003 | Stam | .................. | G06K 9/00664 382/104 |
| 2004/0201483 A1* | 10/2004 | Stam | .................... | B60Q 1/1423 340/600 |
| 2005/0134483 A1* | 6/2005 | Monji | .................... | B60Q 1/085 340/933 |
| 2005/0165533 A1* | 7/2005 | Terada | ............... | B60K 31/0008 701/93 |
| 2006/0177098 A1* | 8/2006 | Stam | .................. | G06K 9/00791 382/104 |
| 2007/0267993 A1* | 11/2007 | Leleve | ............... | G06K 9/00791 318/483 |
| 2009/0010494 A1* | 1/2009 | Bechtel | .................. | G01S 11/12 382/104 |
| 2009/0074249 A1* | 3/2009 | Moed | ................ | G06K 9/00818 382/104 |
| 2009/0244263 A1* | 10/2009 | Saito | .................. | G06K 9/00805 348/47 |
| 2012/0116632 A1* | 5/2012 | Bechtel | ................ | H04N 5/3454 701/36 |
| 2012/0123638 A1* | 5/2012 | Bechtel | ................ | B60Q 1/1423 701/36 |
| 2013/0027557 A1* | 1/2013 | Hirai | .................. | G06K 9/00791 348/148 |
| 2013/0188051 A1* | 7/2013 | Ishigaki | ............. | G06K 9/00791 348/148 |
| 2013/0208120 A1* | 8/2013 | Hirai | .................. | G06K 9/00825 348/148 |
| 2014/0029008 A1* | 1/2014 | Hirai | .................... | G01N 21/552 356/445 |
| 2014/0241589 A1* | 8/2014 | Weber | ..................... | G06T 5/004 382/108 |
| 2014/0300744 A1* | 10/2014 | Kasahara | ............. | H04N 7/183 348/148 |
| 2014/0307247 A1* | 10/2014 | Zhu | ....................... | G01S 17/931 356/4.01 |
| 2015/0088374 A1* | 3/2015 | Yopp | ........................ | B60S 1/04 701/36 |
| 2015/0266489 A1* | 9/2015 | Solyom | ............... | B60W 50/029 701/23 |
| 2016/0100088 A1* | 4/2016 | Sekiguchi | ............. | G06K 9/209 701/48 |
| 2016/0131579 A1* | 5/2016 | Sekiguchi | ............. | B60S 1/0844 701/36 |
| 2016/0132705 A1* | 5/2016 | Kovarik | ............ | G06K 7/10376 340/10.3 |
| 2017/0270381 A1* | 9/2017 | Itoh | .................. | G06K 9/00791 |
| 2017/0282869 A1* | 10/2017 | Tong | ........................ | B60T 7/22 |
| 2018/0001871 A1* | 1/2018 | Steward | ................ | B60S 1/0818 |
| 2018/0307239 A1* | 10/2018 | Shalev-Shwartz | ......................... | G05D 1/0253 |

FOREIGN PATENT DOCUMENTS

| | | |
|---|---|---|
| JP | 03-248950 | 11/1991 |
| JP | 2007-125984 | 5/2007 |
| JP | 2014-015164 | 1/2014 |
| JP | 2014-213805 | 11/2014 |
| JP | 2015-223926 | 12/2015 |
| JP | 2015-230573 | 12/2015 |
| JP | 2016-016780 | 2/2016 |
| JP | 2016-193660 | 11/2016 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2017-226774, filed Nov. 27, 2017, the content of which is incorporated herein by reference.

BACKGROUND OF THE INVENTION

Field of the Invention

The present invention relates to a vehicle control device, a vehicle control method, and a storage medium.

Description of Related Art

When driving a vehicle, it may pass through a tunnel. If the tunnel is long, the weather may change before entering and after exiting the tunnel. Therefore, the weather may be bad, such as rain and snow, near the exit although it was good near the entrance, which may cause instability in driving. Thus, when passing through a tunnel, the driver of a vehicle collects weather information near the exit through a radio or the like and drives carefully.

A technology in which a wiper is activated upon determining that snow is falling as a result of collecting weather information through communication is known in the related art (see, for example, Japanese Unexamined Patent Application, First Publication No. 2014-15164).

SUMMARY OF THE INVENTION

However, weather information near the exit may fail to be collected when radio waves are bad in the tunnel or Internet communication environments are bad.

Aspects of the present invention have been made in view of such circumstances and it is an object of the present invention to provide a vehicle control device, a vehicle control method, and a storage medium that can perform driving control in consideration of the weather on the opposite side of the exit of the tunnel.

A vehicle control device, a vehicle control method, and a storage medium according to the present invention adopt the following configurations.

(1) A vehicle control device according to one aspect of the present invention includes an imaging unit configured to image surroundings of an own-vehicle, a detector configured to detect a state of an external appearance of an oncoming vehicle facing the own-vehicle in a tunnel on the basis of an image captured by the imaging unit, and a determiner configured to determine whether or not the state of the external appearance of the oncoming vehicle satisfies a predetermined condition on the basis of the state of the external appearance of the oncoming vehicle detected by the detector and to determine that the outside of the tunnel toward which the own-vehicle is traveling has bad weather if the state of the external appearance of the oncoming vehicle satisfies the predetermined condition.

(2) In the above aspect (1), the determiner is configured to determine that the outside of the tunnel toward which the own-vehicle is traveling has bad weather if the detector detects that snow is attached to the oncoming vehicle.

(3) In the above aspect (1), the determiner is configured to determine that the outside of the tunnel toward which the own-vehicle is traveling has bad weather if the detector detects that a wiper of the oncoming vehicle is operating.

(4) In the above aspect (1), the detector is configured to detect a state of a road surface of an oncoming lane in which the oncoming vehicle is present on the basis of an image captured by the imaging unit, and the determiner is configured to determine that the outside of the tunnel toward which the own-vehicle is traveling has bad weather if the detector detects that the road surface of the oncoming lane is wet.

(5) In the above aspect (1), the determiner is configured to compare a luminance value of an image captured near an entrance of the tunnel by the imaging unit and a luminance value of an image captured near an exit of the tunnel by the imaging unit and to determine that the outside of the tunnel toward which the own-vehicle is traveling has bad weather on the basis of a result of the comparison.

(6) In the above aspect (1), the vehicle control device further includes a driving controller configured to control one or both of steering or acceleration/deceleration of the own-vehicle, wherein the driving controller is configured to stop control if the determiner determines that the outside of the tunnel toward which the own-vehicle is traveling has bad weather.

(7) In the above aspect (1), the vehicle control device further includes a driving controller configured to control one or both of steering or acceleration/deceleration of the own-vehicle, wherein the driving controller is configured to decelerate the own-vehicle if the determiner determines that the outside of the tunnel toward which the own-vehicle is traveling has bad weather.

(8) A vehicle control method according to one aspect of the present invention is performed by an in-vehicle computer mounted in an own-vehicle, and includes the in-vehicle computer detecting a state of an external appearance of an oncoming vehicle facing the own-vehicle in a tunnel on the basis of an image captured by an imaging unit configured to image surroundings of the own-vehicle, determining whether or not the state of the external appearance of the oncoming vehicle satisfies a predetermined condition on the basis of the detected state of the external appearance of the oncoming vehicle, and determining that the outside of the tunnel toward which the own-vehicle is traveling has bad weather if the state of the external appearance of the oncoming vehicle satisfies the predetermined condition.

(9) A storage medium according to one aspect of the present invention is a computer readable non-transitory storage medium storing a program causing an in-vehicle computer mounted in an own-vehicle having an imaging unit configured to image surroundings of the own-vehicle to detect a state of an external appearance of an oncoming vehicle facing the own-vehicle in a tunnel on the basis of an image captured by the imaging unit, determine whether or not the state of the external appearance of the oncoming vehicle satisfies a predetermined condition on the basis of the detected state of the external appearance of the oncoming vehicle, and determine that the outside of the tunnel toward which the own-vehicle is traveling has bad weather if the state of the external appearance of the oncoming vehicle satisfies the predetermined condition.

According to the above aspects (1) to (9), regardless of the communication environments, it is possible to perform driving control in consideration of the weather on the opposite side of the exit of the tunnel.

DETAILED DESCRIPTION OF THE INVENTION

First Embodiment

Hereinafter, embodiments of a vehicle control device, a vehicle control method, and a storage medium of the present invention will be described with reference to the drawings. The following description will be given with reference to the case in which left-hand traffic laws are applied, but the terms "left" and "right" only need to be reversely read when right-hand traffic laws are applied.

[Overall Configuration]

Figure 1:
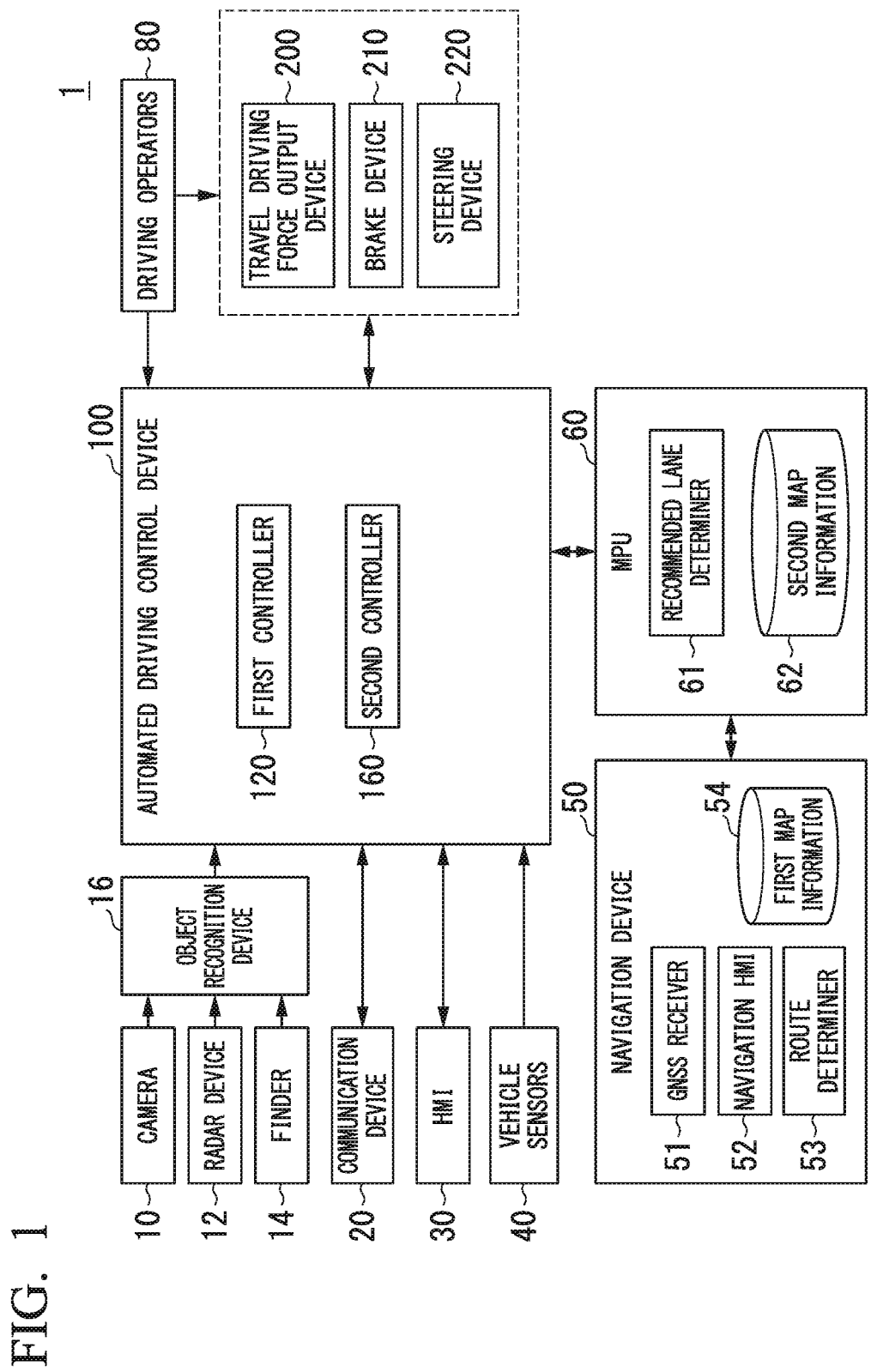
FIG. 1 is a configuration diagram of a vehicle system using a vehicle control device according to an embodiment.

FIG. 1 is a configuration diagram of a vehicle system 1 using a vehicle control device according to a first embodiment. A vehicle in which the vehicle system 1 is mounted is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. When an electric motor is provided, the electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, vehicle sensors 40, a navigation device 50, a map positioning unit (MPU) 60, driving operators 80, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 are attached to the vehicle in which the vehicle system 1 is mounted (hereinafter referred to as an own-vehicle M) at arbitrary locations. For imaging the area in front of the vehicle, a camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. One or a plurality of radar devices 12 may be attached to the own-vehicle M at arbitrary locations. The radar device 12 may detect the position and velocity of an object using a frequency modulated continuous wave (FM-CW) method.

The finder 14 is a light detection and ranging (LIDAR) finder. The finder 14 illuminates the surroundings of the own-vehicle M with light and measures scattered light. The finder 14 detects the distance to a target on the basis of a period of time from when light is emitted to when light is received. The light illuminated is, for example, pulsed laser light. One or a plurality of finders 14 may be attached to the own-vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control device 100. As necessary, the object recognition device 16 may output detection results of the camera 10, the radar device 12 and the finder 14 to the automated driving control device 100 as they are. A speed acquirer may include the radar device 12.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own-vehicle M and receives an input operation from the occupant. The HMI 30 includes various display devices, a speaker, a buzzer, a touch panel, switches, keys, or the like.

The vehicle sensors 40 include a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like.

The navigation device 50 includes, for example, a global navigation satellite system (GNSS) receiver 51, a navigation HMI 52, and a route determiner 53 and holds first map information 54 in a storage device such as a hard disk drive (HDD) or a flash memory. The GNSS receiver 51 specifies the position of the own-vehicle M on the basis of signals received from GNSS satellites. The position of the own-vehicle M may also be specified or supplemented by an inertial navigation system (INS) using the output of the vehicle sensors 40. The navigation HMI 52 includes a display device, a speaker, a touch panel, a key, or the like. The navigation HMI 52 may be partly or wholly shared with the HMI 30 described above. For example, the route determiner 53 determines a route from the position of the own-vehicle M specified by the GNSS receiver 51 (or an arbitrary input position) to a destination input by the occupant (hereinafter referred to as an on-map route) using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The on-map route determined by the route determiner 53 is output to the MPU 60. The navigation device 50 may also perform route guidance using the navigation HMI 52 on the basis of the on-map route determined by the route determiner 53. The navigation device 50 may be realized, for example, by a function of a terminal device such as a smartphone or a tablet possessed by the occupant. The navigation device 50 may also transmit the current position and the destination to a navigation server via the communication device 20 and acquire an on-map route returned from the navigation server.

The MPU 60 functions, for example, as a recommended lane determiner 61 and holds second map information 62 in a storage device such as an HDD or a flash memory. The recommended lane determiner 61 divides the route provided from the navigation device 50 into a plurality of blocks (for example, into blocks each 100 meters long in the direction in which the vehicle travels) and determines a recommended lane for each block by referring to the second map information 62. The recommended lane determiner 61 determines the recommended lane such that it is given a position in a lane order counted from the leftmost lane. When there is a branch point, a merge point, or the like on the route, the recommended lane determiner 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The second map information 62 may be updated as needed by accessing another device using the communication device 20.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or at least one or all of the travel driving force output device 200, the brake device 210, and the steering device 220.

The automated driving control device 100 includes, for example, a first controller 120 and a second controller 160. Each of the first controller 120 and the second controller 160 is realized, for example, by a hardware processor such as a central processing unit (CPU) executing a program (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in a storage device such as a hard disk drive (HDD) or a flash memory in advance or may be stored in a detachable storage medium such as a DVD or a CD-ROM and then installed in the storage device by inserting the storage medium into a drive device.

Figure 2:
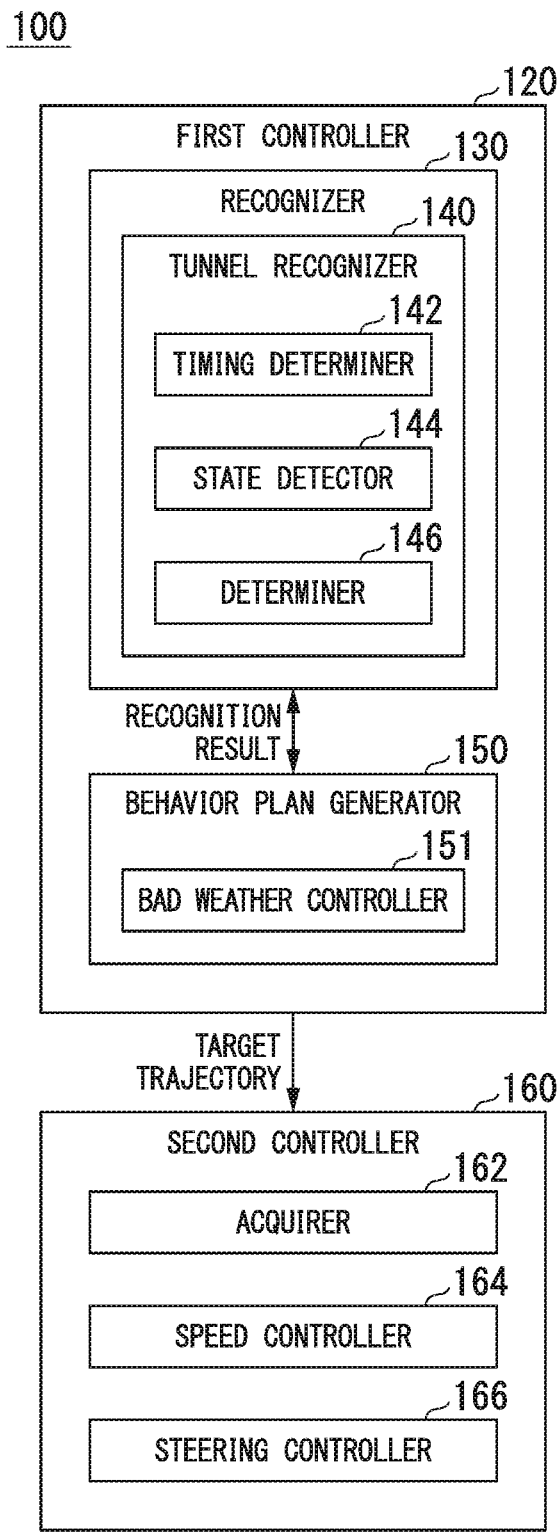
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 150. For example, the first controller 120 realizes a function based on artificial intelligence (AI) and a function based on a previously given model in parallel. For example, the function of "recognizing an intersection" is realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes states of an object near the own-vehicle M such as the position, speed and acceleration thereof on the basis of information input from the camera 10, the radar device 12, and the finder 14 via the object recognition device 16. The position of the object is recognized, for example, as a position in an absolute coordinate system whose origin is a representative point of the own-vehicle M (such as the center of gravity or the center of a drive axis thereof), and used for control. The position of the object may be represented by a representative point of the object such as the center of gravity or a corner thereof or may be represented by an expressed region. The "states" of the object may include an acceleration or jerk of the object or a "behavior state" thereof (for example, whether or not the object is changing or is going to change lanes). The recognizer 130 recognizes the shape of a curve that the own-vehicle M is about to pass on the basis of an image captured by the camera 10. The recognizer 130 converts the shape of the curve from the captured image of the camera 10 into a real plane and outputs information expressed, for example, using two-dimensional point sequence information or a model equivalent thereto to the behavior plan generator 150 as information indicating the shape of the curve.

The recognizer 130 recognizes, for example, a (traveling) lane in which the own-vehicle M is traveling. A recognition result of the lane indicates, for example, which lane the own-vehicle M is traveling in among a plurality of lanes in the same travel direction. When the number of lanes is one, this fact may be a recognition result. For example, the recognizer 130 recognizes the traveling lane, for example, by comparing a pattern of road lane lines (for example, an arrangement of solid and broken lines) obtained from the second map information 62 with a pattern of road lane lines near the own-vehicle M recognized from an image captured by the camera 10. The recognizer 130 may recognize the traveling lane by recognizing travel boundaries (road boundaries) including road lane lines, road shoulders, curbs, a median strip, guard rails, or the like, without being limited to road lane lines. This recognition may be performed taking into consideration a position of the own-vehicle M acquired from the navigation device 50 or a result of processing by the INS. The recognizer 130 recognizes temporary stop lines, obstacles, red lights, toll gates, and other road phenomena.

When recognizing the traveling lane, the recognizer 130 recognizes the position or attitude of the own-vehicle M with respect to the traveling lane. For example, the recognizer 130 may recognize both a deviation from the lane center of the reference point of the own-vehicle M and an angle formed by the travel direction of the own-vehicle M relative to an extension line of the lane center as the relative position and attitude of the own-vehicle M with respect to the traveling lane. Alternatively, the recognizer 130 may recognize the position of the reference point of the own-vehicle M with respect to one of the sides of the traveling lane (a road lane line or a road boundary) or the like as the relative position of the own-vehicle M with respect to the traveling lane.

In the above recognition process, the recognizer 130 may derive the accuracy of recognition and output it as recognition accuracy information to the behavior plan generator 150. For example, the recognizer 130 generates recognition accuracy information on the basis of the frequency of recognition of road lane lines in a certain period.

The recognizer 130 includes a tunnel recognizer 140. The tunnel recognizer 140 includes a timing determiner 142, a state detector 144, and a determiner 146. These components will be described later.

The behavior plan generator 150 determines events which are to be sequentially performed in the automated driving, basically such that the own-vehicle M travels in the recommended lane determined by the recommended lane determiner 61 and copes with situations occurring near the own-vehicle M. Examples of the events include a constant-speed travel event which is an event of traveling in the same traveling lane at a constant speed, a following travel event which is an event of following a preceding vehicle, an overtaking event which is an event of overtaking a preceding vehicle, an avoidance event which is an event of performing braking and/or steering to avoid approaching an obstacle, a curve traveling event which is an event of traveling on a curve, a passing event which is an event of passing through a predetermined point such as an intersection, a pedestrian crossing, or a railroad crossing, a lane change event, a merging event, a branching event, an automatic stop event, and a takeover event which is an event of ending automated driving and switching to manual driving.

The behavior plan generator 150 generates a target trajectory along which the own-vehicle M will travel in the future according to an activated event. Details of each functional unit will be described later. The target trajectory includes, for example, a speed element. The target trajectory is expressed, for example, by an arrangement of points (trajectory points) which are to be reached by the own-vehicle M in order. The trajectory points are points to be reached by the own-vehicle M at intervals of a predetermined travel distance (for example, at intervals of several meters) along the road. Apart from this, a target speed and a target acceleration for each predetermined sampling time (for example, every several tenths of a second) are determined as a part of the target trajectory. The trajectory points may be respective positions of the predetermined sampling times which the own-vehicle M is to reach at the corresponding sampling times. In this case, information on the target speed or the target acceleration is represented with the interval between the trajectory points.

Figure 3:
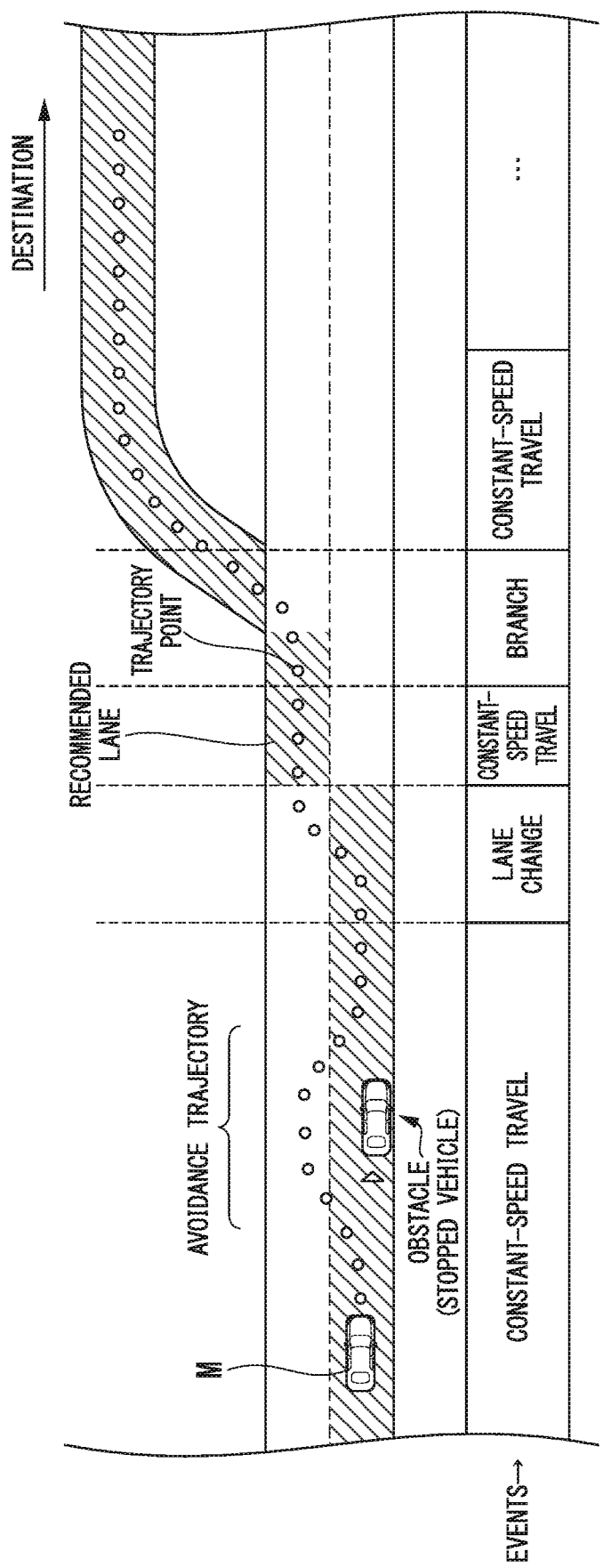
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination. When the own-vehicle M approaches a predetermined distance (which may be determined according to the types of events) before a point for switching to the recommended lane, the behavior plan generator 150 activates a passing event, a lane change event, a branching event, a merging event, or the like. When it becomes necessary to avoid an obstacle during execution of each event, an avoidance trajectory is generated as shown.

The second controller 160 controls the travel driving force output device 200, the brake device 210, and the steering device 220 such that the own-vehicle M passes through the target trajectory generated by the behavior plan generator 150 at scheduled times.

Returning to FIG. 2, the second controller 160 includes, for example, an acquirer 162, a speed controller 164, and a steering controller 166. The acquirer 162 acquires information on the target trajectory (trajectory points) generated by the behavior plan generator 150 and stores it in a memory (not shown). The speed controller 164 controls the travel driving force output device 200 or the brake device 210 on the basis of the speed element included in the target trajectory stored in the memory. The steering controller 166 controls the steering device 220 according to the degree of curvature of the target trajectory stored in the memory. The processing of the speed controller 164 and the steering controller 166 is realized, for example, by a combination of feedforward control and feedback control. As one example, the steering controller 166 performs the processing by combining feedforward control according to the curvature of the road ahead of the own-vehicle M and feedback control based on deviation from the target trajectory.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the second controller 160 or information input from the driving operators 80 to change the direction of the steering wheels.

Next, each of the components of the tunnel recognizer 140 included in the recognizer 130 will be described in detail.

The timing determiner 142 determines whether or not the own-vehicle M is traveling near the entrance or exit of a tunnel. For example, the timing determiner 142 compares the position and route of the own-vehicle M with the second map information 62 and determines that the own-vehicle is traveling near the entrance or exit of a tunnel when the own-vehicle M has reached a predetermined distance before the entrance or exit of a tunnel. The timing determiner 142 may recognize the shape of the entrance or exit of the tunnel present ahead in the travel direction of the own-vehicle M on the basis of an image captured by the camera 10 using a method such as pattern matching and determine whether or not the own-vehicle M has reached a predetermined distance before the entrance or exit of the tunnel on the basis of the size or the like of the recognized tunnel. Upon determining that the own-vehicle M is traveling near the entrance or exit, the timing determiner 142 outputs the determination result to the state detector 144.

The state detector 144 detects the states of an oncoming vehicle m corresponding to the own-vehicle M in the tunnel on the basis of the image captured by the camera 10. For example, the state detector 144 detects the states of the oncoming vehicle m by analyzing images of frames before and after the timing determined by the timing determiner 142 out of images captured by the camera 10. The states of the oncoming vehicle m detected by the state detector 144 include, for example, a state in which snow is on the roof of the oncoming vehicle m, a state in which the vehicle body of the oncoming vehicle m is wet, or a state in which a wiper is moving on the windshield of the oncoming vehicle m.

The state detector 144 detects the states of the oncoming vehicle m, for example, using a machine learning method such as deep learning. The state detector 144 may detect the states of the oncoming vehicle m through a modeling method such as pattern matching or may perform the machine learning method and the modeling method in parallel. Upon detecting a state of the oncoming vehicle m predetermined as a determination target, the state detector 144 outputs information indicating the detection of the state to the determiner 146.

Figure 4:
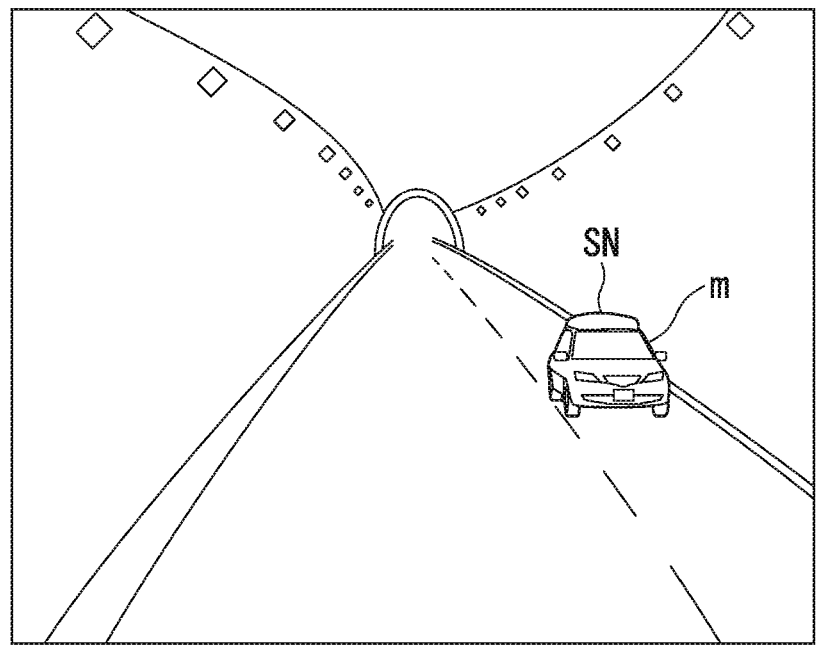
FIG. 4 is an example of an image obtained by imaging a scene in which a white object is on a roof of an oncoming vehicle.
Figure 5:
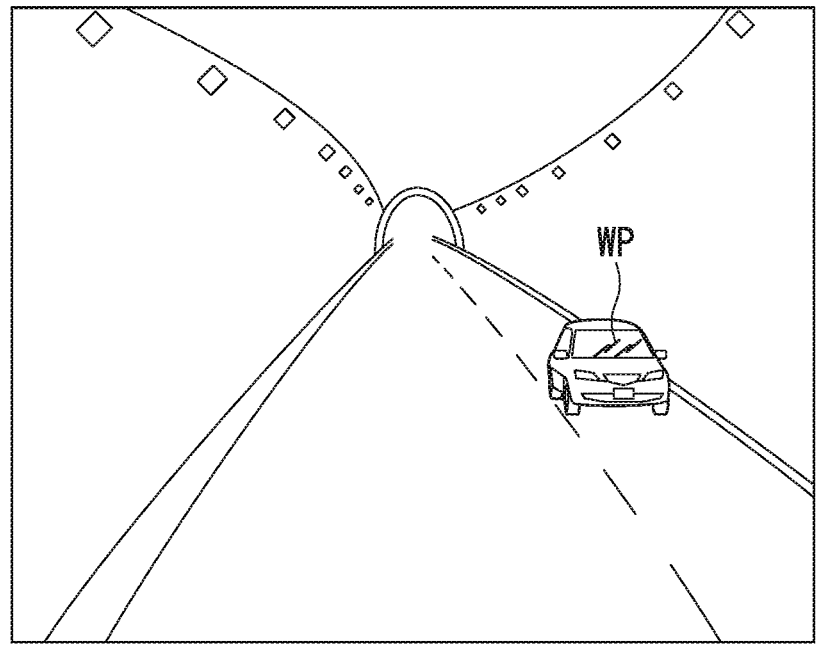
FIG. 5 is an example of an image obtained by imaging a scene in which a wiper is moving on a windshield of an oncoming vehicle.

FIGS. 4 and 5 are examples of images captured by the camera 10. FIG. 4 is an example of an image 301 obtained by imaging a scene in which snow SN is on the roof of the oncoming vehicle m. FIG. 5 is an example of an image 302 obtained by imaging a scene in which the wiper WP is moving on the windshield of the oncoming vehicle m. The state detector 144 detects a state in which snow is on the roof of the oncoming vehicle m on the basis of the image 301 using the method described above. The state detector 144 detects a state in which the wiper of the oncoming vehicle m is operating on the basis of the image 302 using the method described above.

Figure 6:
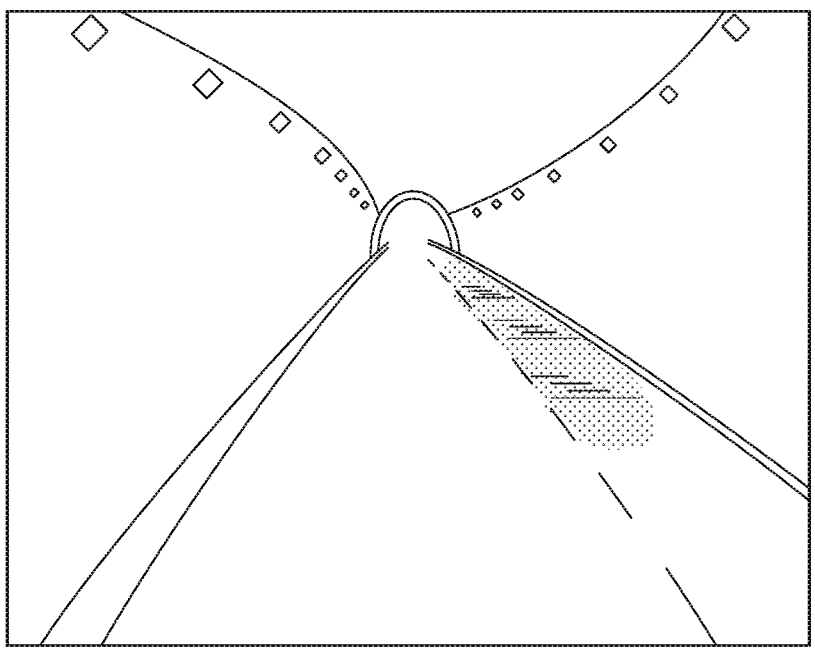
FIG. 6 is an example of an image obtained by imaging a scene in which a road surface of an oncoming lane is wet.

The state detector 144 may detect the state of the road surface of an oncoming lane in which the oncoming vehicle m is present on the basis of the image captured by the camera 10. For example, the state detector 144 derives an average luminance value Bv11 of a region corresponding to the own lane in which the own-vehicle M is traveling and an average luminance value Bv12 of a region corresponding to the oncoming lane in the captured image, compares the derived average luminance value Bv11 of the own lane and the derived average luminance value Bv12 of the region corresponding to the oncoming lane, and detects a state in which the road surface of the oncoming lane is wet or frozen if the difference between the luminance values is equal to or greater than a threshold value. FIG. 6 is an example of an image 303 obtained by imaging a scene in which the road surface of the oncoming lane is wet. When the image 303 as shown in FIG. 6 is captured by the camera 10, the state detector 144 outputs information indicating that the oncoming lane is wet to the determiner 146.

The state detector 144 may detect the state of the opposite side of the exit of the tunnel toward which the own-vehicle M is traveling on the basis of the image captured by the camera 10. For example, the state detector 144 detects that the brightness of the opposite side of the exit of the tunnel is lower than the brightness before the entrance of the tunnel on the basis of the difference between an average luminance value of a predetermined region of an image captured near the entrance of the tunnel and an average luminance value of a predetermined region of an image captured near the exit of the tunnel.

Figure 7:
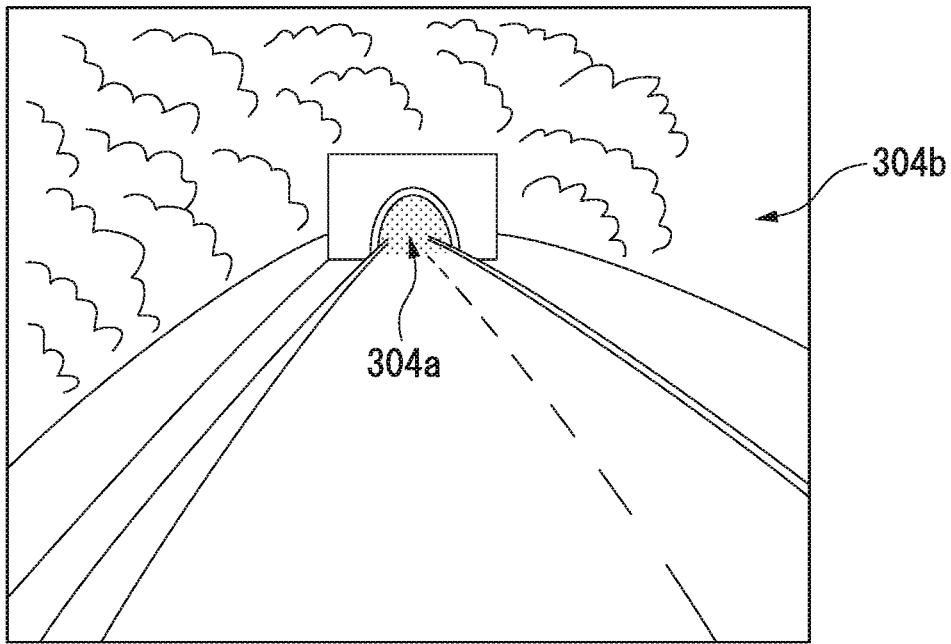
FIG. 7 is an example of an image obtained by imaging a scene near the entrance of a tunnel.
Figure 8:
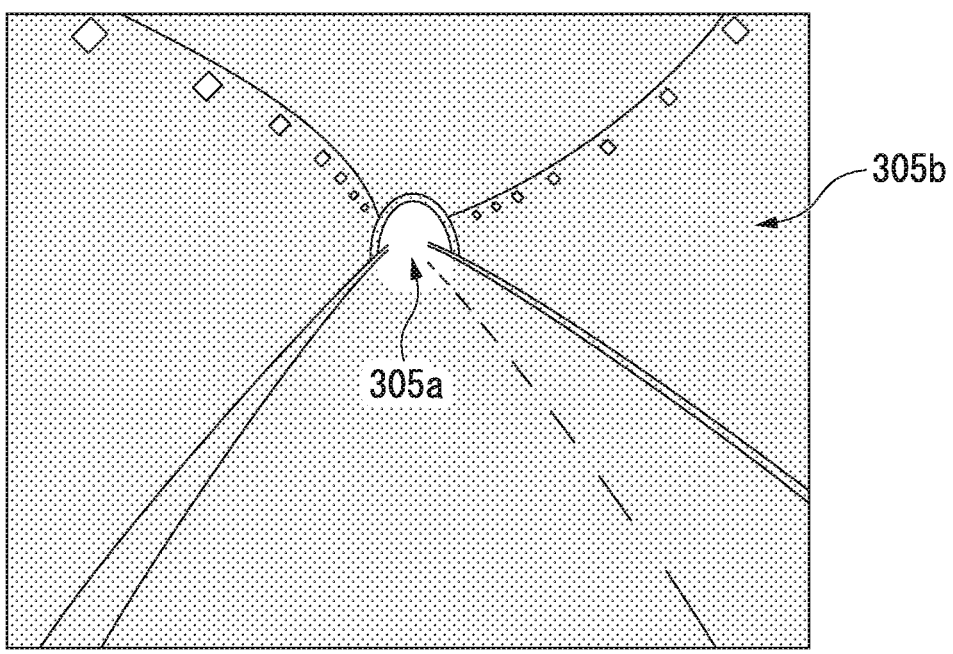
FIG. 8 is an example of an image obtained by imaging a scene near the exit of the tunnel.

Here, an example in which the state of the opposite side of the exit of the tunnel is detected on the basis of the luminance difference between predetermined regions of images captured near the entrance and exit of the tunnel will be described with reference to FIGS. 7 and 8. FIG. 7 is an example of an image 304 obtained by imaging a scene near the entrance of the tunnel. FIG. 8 is an example of an image 305 obtained by imaging a scene near the exit of the tunnel. The image 304 (or the image 305) is, for example, an image captured at the timing when the own-vehicle M arrives a predetermined distance before the entrance of the tunnel (or a predetermined distance before the exit of the tunnel). The timing determiner 142 may acquire an image at a predetermined distance before the entrance of the tunnel (or at a predetermined distance before the exit of the tunnel) according to the proportion of the size or shape of the tunnel in the entire image.

First, the state detector 144 discriminates between an internal image region 304a obtained by imaging the opposite side of the entrance of the tunnel and an external image region 304b obtained by imaging the other landscape around the tunnel in the image 304. For example, the state detector 144 derives luminance values of all pixels of the image 304 and acquires a boundary line where the difference between luminance values of adjacent pixels is equal to or greater than a predetermined value. The state detector 144 recognizes one of the regions divided by this boundary line having a lower average luminance value as the internal image region 304a and recognizes the other having a higher average luminance value as the external image region 304b. Then, the state detector 144 acquires an average luminance value Bv21 of the external image region 304b. The state detector 144 discriminates between an external image region 305a obtained by imaging the landscape of the opposite side of the exit of the tunnel and an internal image region 305b, other than the external image region 305a, obtained by imaging the inside of the tunnel in the image 305. For example, the state detector 144 derives luminance values of all pixels of the image 305 and acquires a boundary line where the difference between luminance values of adjacent pixels is equal to or greater than a predetermined value. The state detector 144 recognizes one of the regions divided by this boundary line having a higher average luminance value as an external image region 305a and recognizes the other having a lower average luminance value as an internal image region 305b. Then, the state detector 144 acquires an average luminance value Bv22 of the external image region 305a. The state detector 144 compares the derived luminance average value Bv21 and the derived luminance average value Bv22 and outputs information indicating that the difference between the two values is equal to or greater than a threshold value to the determiner 146 if the difference is equal to or greater than the threshold value. The state detector 144 may compare an average luminance value of the entire image near the entrance of the tunnel and an average luminance value of the entire image near the exit of the tunnel, not limited to comparing the luminance values of parts of the images.

On the basis of the detection results of the state detector 144 (the state of the oncoming vehicle m, the state of the oncoming lane, the state of the opposite side of the exit of the tunnel, or the like), the determiner 146 determines whether or not the outside of the tunnel toward which the own-vehicle M is traveling has bad weather. The determiner 146 determines that the outside of the tunnel toward which the own-vehicle M is traveling has bad weather, for example, when one or more of condition (A) that snow is attached to the oncoming vehicle m, condition (B) that the oncoming vehicle m is wet, or condition (C) that the wiper of the oncoming vehicle m is operating are satisfied. The determiner 146 may derive the certainty of the determination result on the basis of the detection result of the state detector 144 and may output the derived certainty to a bad weather controller 151. For example, the determiner 146 derives a point corresponding to the number of detected states among the states (A) to (C) and outputs the derived point as the certainty to the bad weather controller 151.

When it is detected that the road surface of the oncoming lane is wet or frozen, the determiner 146 determines that the outside of the tunnel toward which the own-vehicle M is traveling has bad weather. The determiner 146 may derive the certainty according to the length of the wet or frozen road surface and may output the derived certainty to the bad weather controller 151. For example, the certainty may be determined according to the length over which the road surface continues to be detected as being wet or frozen or may be determined according to the distance to the exit of the tunnel from a position at which the road surface is first detected as being wet or frozen.

Further, the determiner 146 determines that the outside of the tunnel toward which the own-vehicle M is traveling has bad weather when the difference between the average luminance value of an external image region in an image captured near the entrance of the tunnel and the average luminance value of an external image region in an image captured near the exit of the tunnel is equal to or greater than a threshold value (that is, when the state detector 144 has detected a state in which the brightness of the opposite side of the exit of the tunnel is lower than the brightness before the entrance of the tunnel). The determiner 146 may derive the certainty according to the difference between the average luminance values and may output the derived certainty to the bad weather controller 151. For example, the determiner 146 makes the certainty higher when the difference between the average luminance values is large as compared to when the difference between the average luminance values is small.

The determiner 146 may increase the certainty of the determination result by combining such determination methods. Examples of combinations will be described later.

Next, the bad weather controller 151 included in the behavior plan generator 150 will be described in detail. When the determiner 146 has determined that the outside of the tunnel toward which the own-vehicle M is traveling has bad weather, the bad weather controller 151 stops automated driving control and switches to manual driving control. When the determiner 146 has determined that the outside of the tunnel toward which the own-vehicle M is traveling has bad weather, the bad weather controller 151 may perform control for decelerating the own-vehicle M.

For example, the bad weather controller 151 controls the brake device 210 such that the speed after passing through the exit of the tunnel becomes a predetermined speed or less.

When the determiner 146 has derived the certainty, the bad weather controller 151 may perform the above-described control according to the derived certainty. For example, the bad weather controller 151 does not perform the above-described control when the certainty is 0 and performs the above-described control when the certainty is greater than 0. When the certainty is greater than 0, the bad weather controller 151 may change the amount of control and the control timing according to the certainty. For example, when the certainty is low, the bad weather controller 151 delays the control timing or decreases the amount of deceleration as compared to when the certainty is high.

Figure 9:
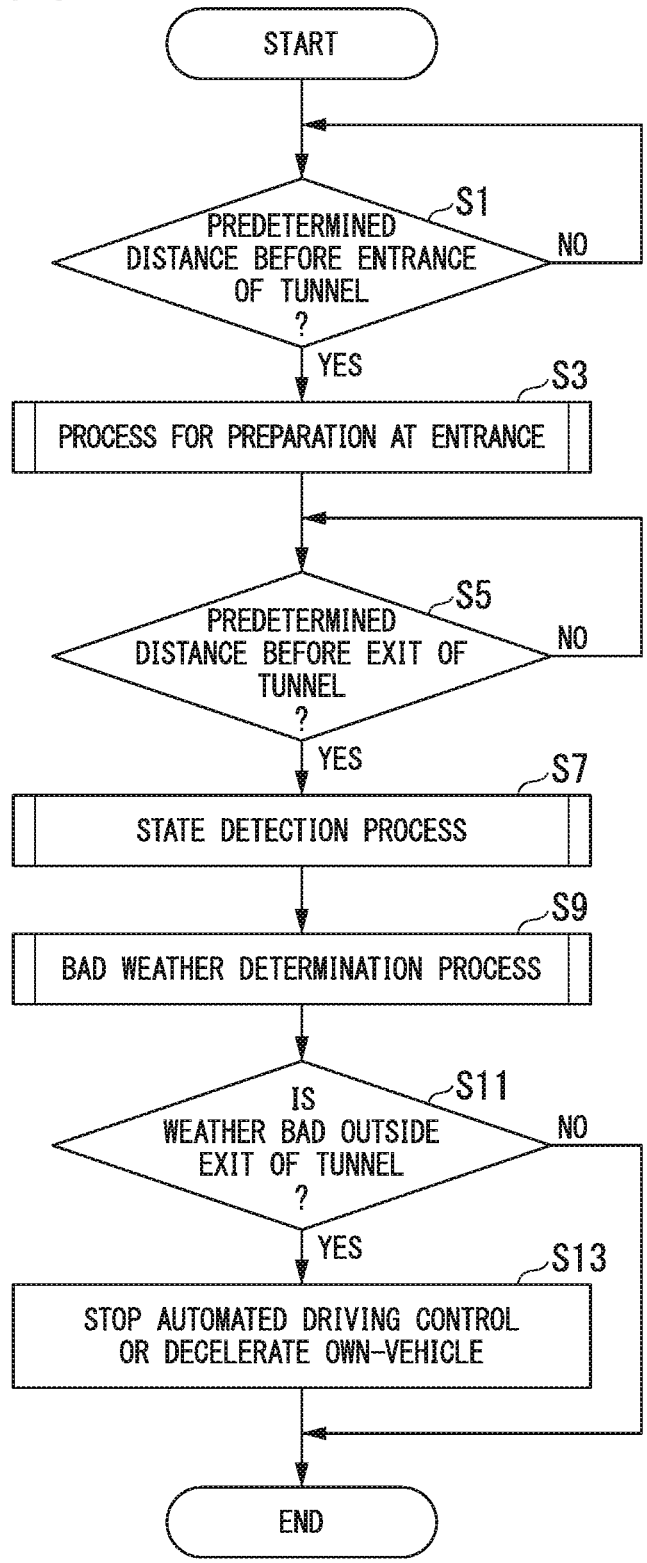
FIG. 9 is a flowchart showing an example of a flow of a process performed by a first controller.

Next, an example of processing by the first controller 120 will be described with reference to FIG. 9. FIG. 9 is a flowchart showing an example of a flow of processing performed by the first controller 120.

First, the timing determiner 142 determines whether or not the own-vehicle M has reached a predetermined distance before the entrance of the tunnel (step S1). When the own-vehicle M has not reached the predetermined distance before the entrance of the tunnel, the timing determiner 142 repeats the process until it is reached. When the own-vehicle M has reached the predetermined distance before the entrance of the tunnel, the state detector 144 performs a process for preparation at the entrance of the tunnel as necessary (step S3). This is performed when a state detection processing method which requires capturing of an image at the entrance is adopted. Details will be described later.

Next, the timing determiner 142 determines whether or not the own-vehicle M has reached a predetermined distance before the exit of the tunnel (step S5). When it is determined that the own-vehicle M has not reached the predetermined distance before the exit of the tunnel, the timing determiner 142 repeats the process until it is determined that it has been reached. When it is determined that the own-vehicle has reached the predetermined distance before the exit of the tunnel, the state detector 144 performs a state detection process (step S7). Then, on the basis of the detection result of the state detector 144, the determiner 146 performs a process of determining whether or not the outside of the tunnel toward which the own-vehicle M is traveling has bad weather (step S9).

Then, the bad weather controller 151 determines whether or not the determination result of the determiner 146 indicates that the weather is bad (step S11). When the determination result of the determiner 146 indicates that the weather is bad, the bad weather controller 151 stops the automated driving control or decelerates the own-vehicle M (step S13). When the determination result of the determiner 146 indicates that the weather is not bad, the bad weather controller 151 does not perform any processing.

Next, an example of processing by the determiner 146 will be described with reference to FIGS. 10 to 14. FIGS. 10 to 14 are flowcharts showing examples of flows of processing performed by the determiner 146. Hereinafter, first to fifth different determination processes will be described with reference to the respective drawings. The state detector 144 detects a state (the state of the oncoming vehicle m, the state of the oncoming lane, the state of the opposite side of the exit of the tunnel, or the like) through the process of any of FIGS. 10 to 14 (corresponding to step S7 in FIG. 9). The determiner 146 determines whether or not the weather is bad on the opposite side of the exit of the tunnel through the process of any of FIGS. 10 to 14 (corresponding to step S9 in FIG. 9).

Figure 10:
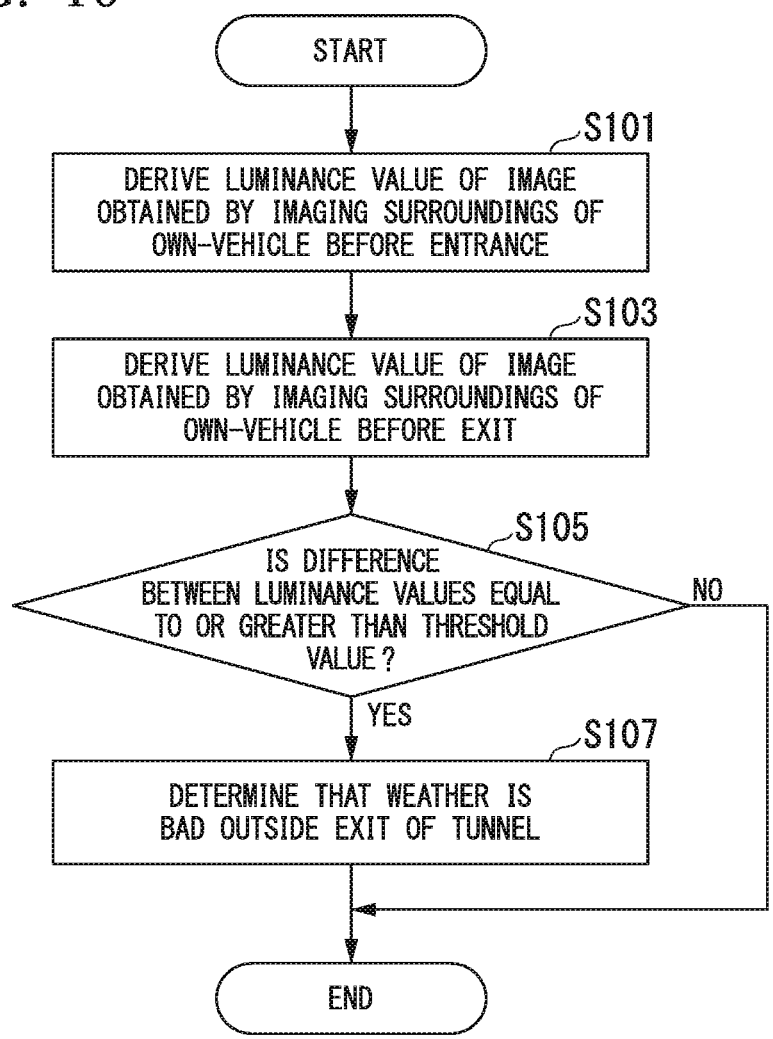
FIG. 10 is a flowchart showing an example of a flow of a first determination process performed by a determiner.

First, the first determination process of the determiner 146 will be described with reference to FIG. 10. Upon reaching a predetermined distance before the entrance of the tunnel, the state detector 144 acquires an image (for example, the image 304) obtained by imaging the surroundings of the own-vehicle M near the entrance of the tunnel out of images captured by the camera 10 and derives an average luminance value Bv21 of the external image region 304b on the basis of the acquired image 304 (step S101). This process corresponds to step S3 in FIG. 9. Next, upon reaching a predetermined distance before the exit of the tunnel, the state detector 144 detects an image (for example, the image 305) obtained by imaging the surroundings of the own-vehicle M near the exit of the tunnel out of images captured by the camera 10 and derives an average luminance value Bv22 of the external image region 305a on the basis of the acquired image 305 (step S103).

Then, the determiner 146 determines whether or not the difference between the average luminance value Bv21 derived in step S101 and the average luminance value Bv22 derived in step S103 is equal to or greater than a threshold value (step S105). When the difference between the average luminance values is equal to or greater than the threshold value, the determiner 146 determines that the weather is bad outside the exit of the tunnel (step S107). On the other hand, when the difference between the average luminance values is not equal to or greater than the threshold value, the determiner 146 determines that the weather is not bad outside the exit of the tunnel.

Figure 11:
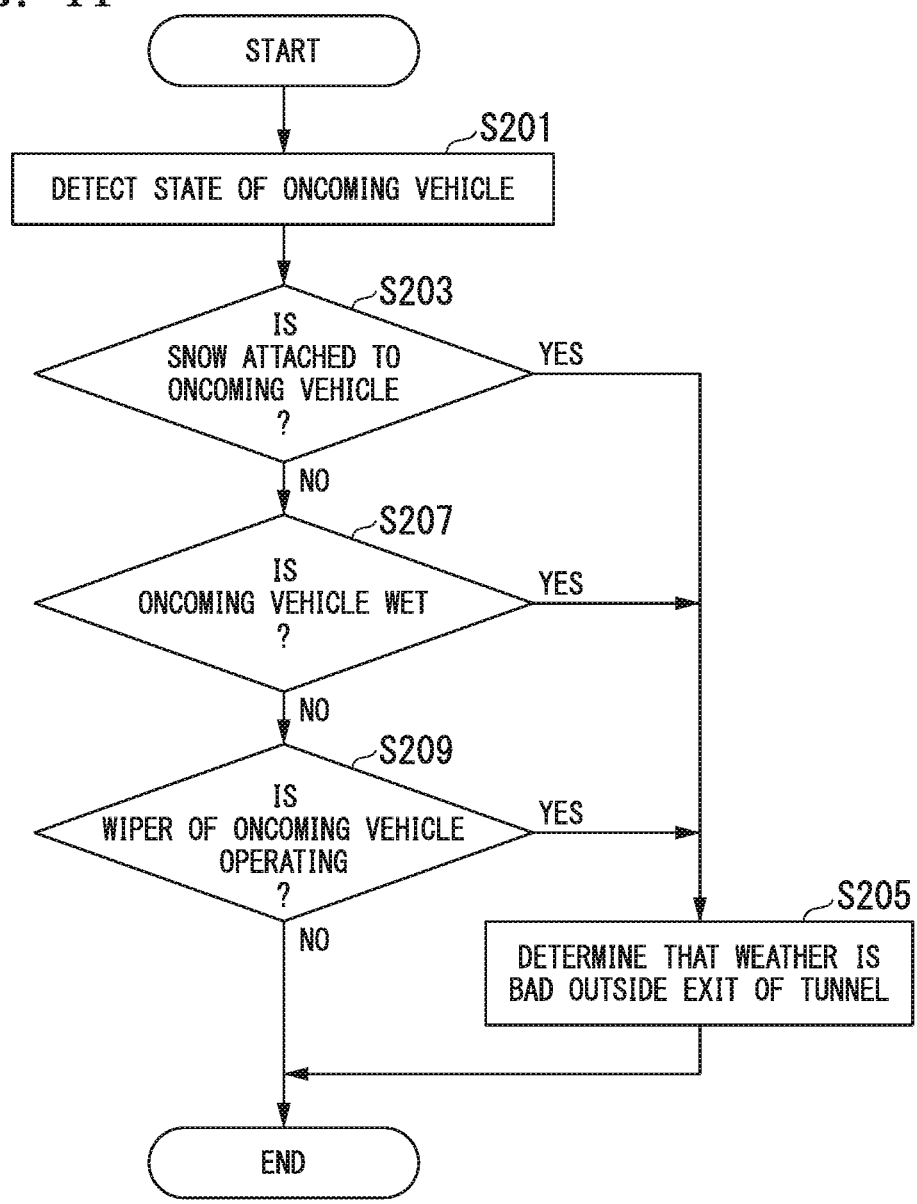
FIG. 11 is a flowchart showing an example of a flow of a second determination process performed by the determiner.

Next, the second determination process of the determiner 146 will be described with reference to FIG. 11. Upon reaching a predetermined distance before the exit of the tunnel, the state detector 144 detects the state of the oncoming vehicle m (step S201). Then, the determiner 146 determines whether or not a state in which snow is attached to the oncoming vehicle m has been detected by the state detector 144 (step S203).

Upon determining that a state in which snow is attached to the oncoming vehicle m has been detected, the determiner 146 determines that the weather is bad outside the exit of the tunnel (step S205). On the other hand, upon determining that a state in which snow is attached to the oncoming vehicle m has not been detected, the determiner 146 determines whether or not a state in which the oncoming vehicle m is wet has been detected by the state detector 144 (step S207). Upon determining that a state in which the oncoming vehicle m is wet has been detected, the determiner 146 determines that the weather is bad outside the exit of the tunnel (step S205). On the other hand, upon determining that a state in which the oncoming vehicle m is wet has not been detected, the determiner 146 determines whether or not a state in which the wiper of the oncoming vehicle m is operating has been detected by the state detector 144 (step S209). Upon determining that a state in which the wiper of the oncoming vehicle m is operating has been detected, the determiner 146 determines that the weather is bad outside the exit of the tunnel (step S205). On the other hand, upon determining that a state in which the wiper of the oncoming vehicle m is operating has not been detected, the determiner 146 ends the process.

Figure 12:
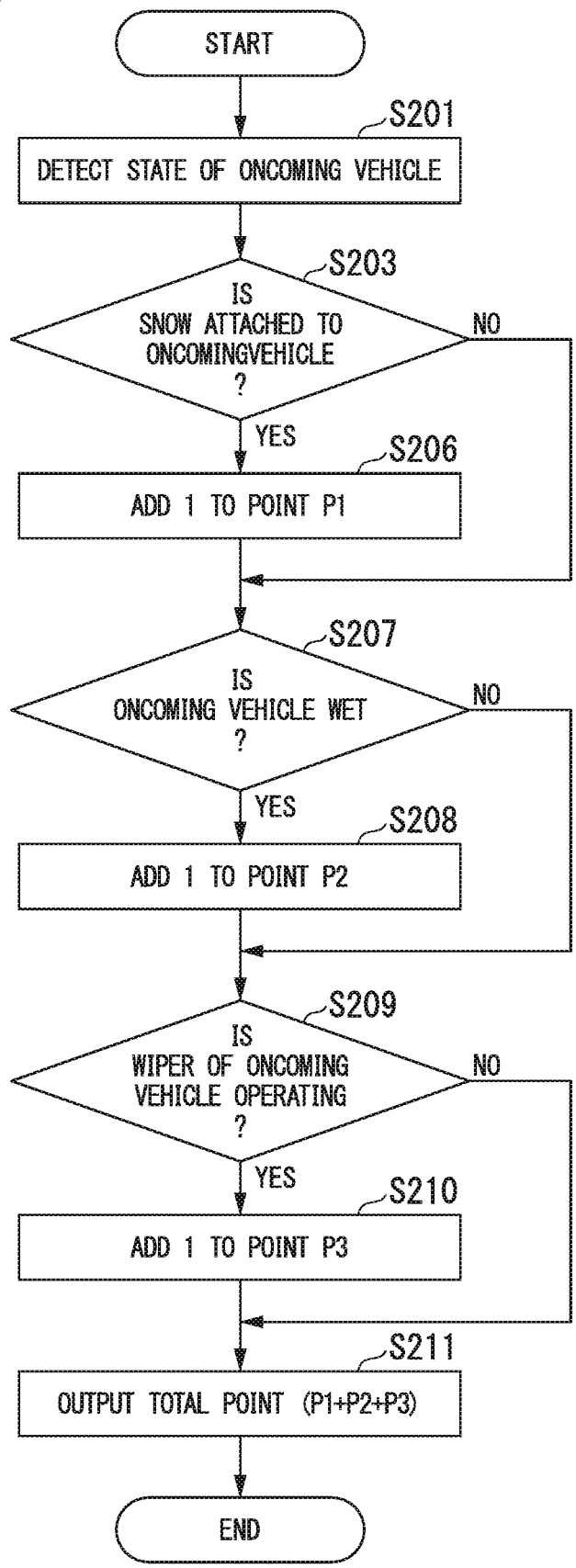
FIG. 12 is a flowchart showing an example of a flow of a third determination process performed by the determiner.

Next, the third determination process of the determiner 146 will be described with reference to FIG. 12. The third determination process is an example of deriving the certainty on the basis of the state of the oncoming vehicle m. Processes similar to those in the second determination process are denoted by the same reference numerals and a detailed description thereof will be omitted. Points P1 to P3 mentioned in the description are 0 in the initial state.

Upon determining in step S203 that a state in which snow is attached to the oncoming vehicle m has been detected, the determiner 146 adds 1 to the point P1 (step S206). Next, regardless of whether or not it is determined in step S203 that a state in which snow is attached to the oncoming vehicle m has been detected, the determiner 146 determines whether or not a state in which the oncoming vehicle m is wet has been detected (step S207). Upon determining that a state in which the oncoming vehicle m is wet has been detected, the determiner 146 adds 1 to the point P2 (step S208). Next, regardless of whether or not it is determined in step S207 that a state in which the oncoming vehicle m is wet has been detected, the determiner 146 determines whether or not a state in which the wiper of the oncoming vehicle m is operating has been detected (step S209). Upon determining that a state in which the wiper of the oncoming vehicle m is operating has been detected, the determiner 146 adds 1 to the point P3 (step S210). Next, the determiner 146 sums the points P1 to P3 and outputs a total point (certainty) obtained by the summation to the bad weather controller 151 (step S211).

Thereafter, the determiner 146 resets the values of the points P1 to P3.

When the certainty is derived by the determiner 146 as in the third determination process, the bad weather controller 151 may determine whether or not the certainty is 0, instead of the processing in step S5 in FIG. 9, and may perform the process of step S7 in FIG. 9 upon determining that the certainty is not 0. Upon determining that the certainty is not 0, the bad weather controller 151 may perform control according to the certainty instead of the process of step S7 in FIG. 9.

Figure 13:
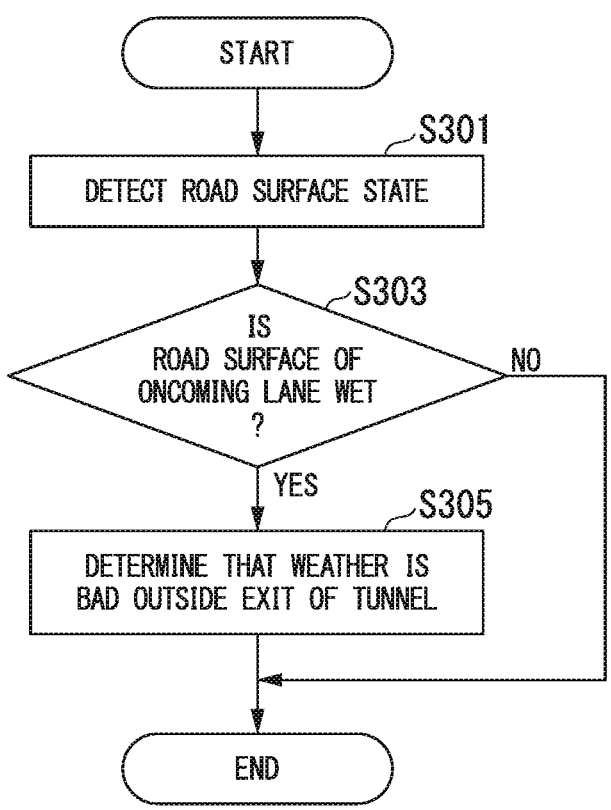
FIG. 13 is a flowchart showing an example of a flow of a fourth determination process performed by the determiner.

Next, the fourth determination process of the determiner 146 will be described with reference to FIG. 13. Upon reaching a predetermined distance before the exit of the tunnel, the state detector 144 detects the road surface state of the oncoming lane (step S301). Then, the determiner 146 determines whether or not a state in which the road surface of the oncoming lane is wet (or frozen) has been detected by the state detector 144 (step S303). Upon determining that a state in which the road surface of the oncoming lane is wet has been detected, the determiner 146 determines that the weather is bad outside the exit of the tunnel (step S305). On the other hand, upon determining that a state in which the road surface of the oncoming lane is wet has not been detected, the determiner 146 ends the process.

Figure 14:
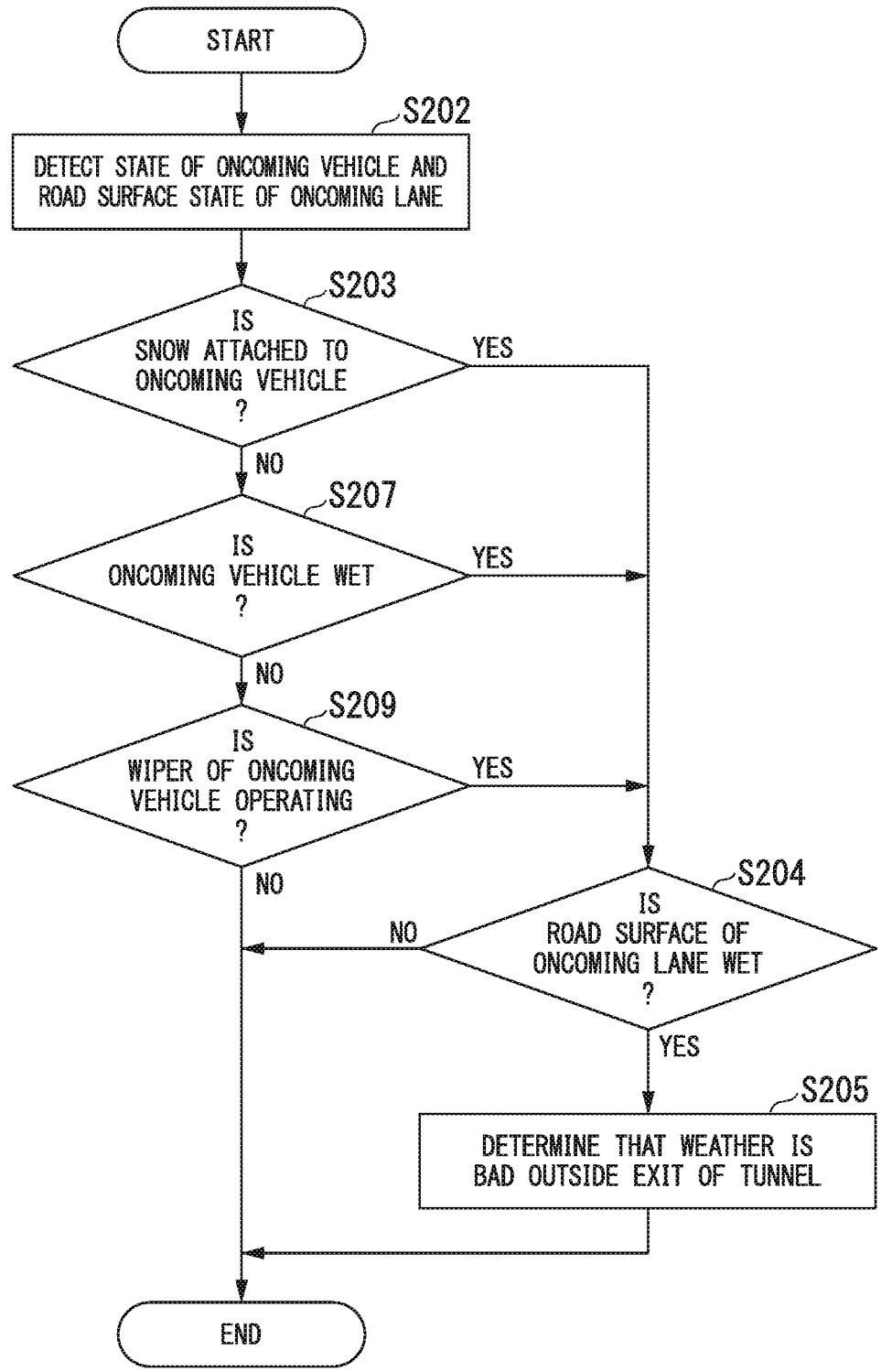
FIG. 14 is a flowchart showing an example of a flow of a fifth determination process performed by the determiner.

Next, the fifth determination process of the determiner 146 will be described with reference to FIG. 14. The fifth determination process is a combination of the second determination process and the fourth determination process, and processes similar to those in the second determination process are denoted by the same reference numerals and a detailed description thereof will be omitted.

Upon reaching a predetermined distance before the exit of the tunnel, the state detector 144 detects both the state of the oncoming vehicle m and the road surface state of the oncoming lane (step S202). Then, the determiner 146 performs at least one of the processes of steps S203, S207, and S209 on the basis of the detection result of the state detector 144. Upon determining in step S203 that a state in which snow is attached to the oncoming vehicle m has been detected, upon determining in step S207 that a state in which the oncoming vehicle m is wet has been detected, or upon determining in step S209 that a state in which the wiper of the oncoming vehicle m is operating has been detected, the determiner 146 determines whether or not a state in which the road surface of the oncoming vehicle is wet (or frozen) has been detected by the state detector 144 in step S202 (step S204). Upon determining that a state in which the road surface of the oncoming lane is wet has been detected, the determiner 146 determines that the weather is bad outside the exit of the tunnel (step S205). On the other hand, upon determining in step S204 that a state in which the road surface of the oncoming lane is wet has not been detected, and upon determining in step S209 that a state in which the wiper of the oncoming vehicle m is operating has not been detected, the determiner 146 ends the process. Thereby, even when the oncoming vehicle m having snow attached thereto or the oncoming vehicle m that is wet has been detected or when the oncoming vehicle m on which the wiper is operating has been detected, the weather is more likely to be bad on the opposite side of the area near the exit of the tunnel than the area near the exit of the tunnel if the road surface near the exit of the tunnel is not wet. In such a case, the determiner 146 determines that the place where snow or rain falls is not the area near the exit of the tunnel and determines that the weather is not bad on the opposite side of the area near the exit of the tunnel.

According to the vehicle control device of the present embodiment described above, the state detector 144 that detects the state of the oncoming vehicle m facing the own-vehicle M in the tunnel, and the determiner 146 that determines whether or not the outside of the tunnel toward which the own-vehicle M is traveling has bad weather on the basis of the state of the oncoming vehicle m detected by the state detector 144 are provided, whereby it is possible to acquire the weather condition of the opposite side of the exit of the tunnel, regardless of the communication environment, and if the weather is bad on the opposite side of the exit of the tunnel, it is possible to perform driving control according to bad weather. For example, by switching from automated driving control to manual driving control, it is possible to change to careful driving by the driver. By decelerating the own-vehicle M, it is also possible to contribute to avoidance of accidents such as slipping.

Second Embodiment

An example in which a recognizer 130 and a bad weather controller 151 having functions and configurations similar to those of the first controller 120 described above are used for a vehicle having a driving support function will be described below with reference to FIG. 15.

Figure 15:
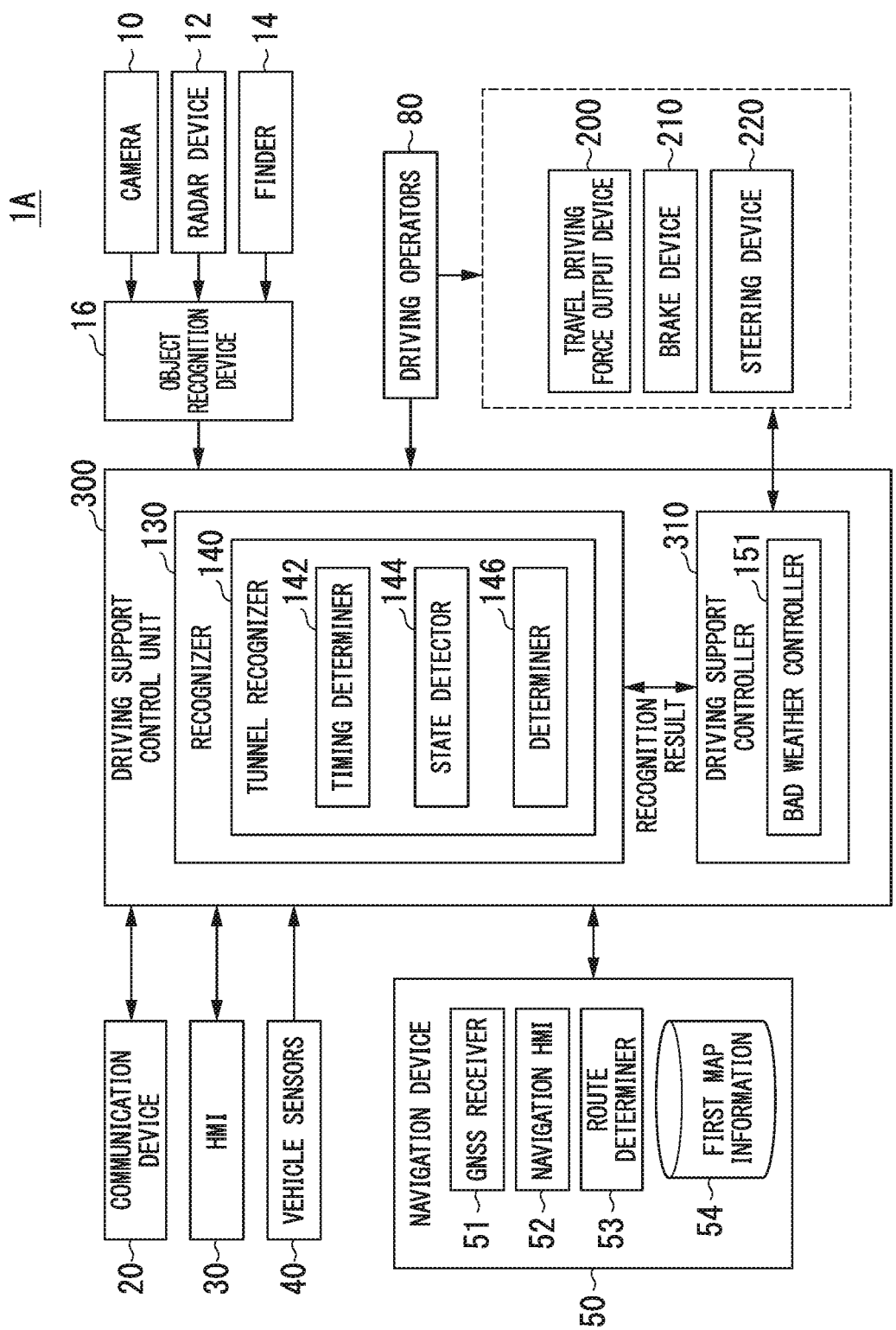
FIG. 15 is a configuration diagram of a vehicle system using the vehicle control device according to an embodiment.

FIG. 15 is a configuration diagram of a vehicle system 1A that uses a vehicle control device according to the embodiment for a vehicle having a driving support function. Descriptions of functions and configurations similar to those of the vehicle system 1 will be omitted. For example, the vehicle system 1A includes a driving support control unit 300 in place of some of the components of the vehicle system 1. The driving support control unit 300 includes the recognizer 130 and a driving support controller 310. The driving support controller 310 includes the bad weather controller 151. The components shown in FIG. 15 are merely an example and some of the components may be omitted or other components may be added.

For example, the driving support controller 310 has functions such as a lane keeping assist system (LKAS), an adaptive cruise control system (ACC), and an auto lane change system (ALC). For example, under the control of the bad weather controller 151, the driving support controller 310 performs automatic deceleration control such that the speed after passing through the exit of the tunnel becomes a predetermined speed or less. Under the control of the bad weather controller 151, the driving support controller 310 stops driving support control and switches to manual driving control.

According to the vehicle control device of the second embodiment described above, it is possible to achieve the same advantages as those of the first embodiment.

<Hardware Configuration>

Figure 16:
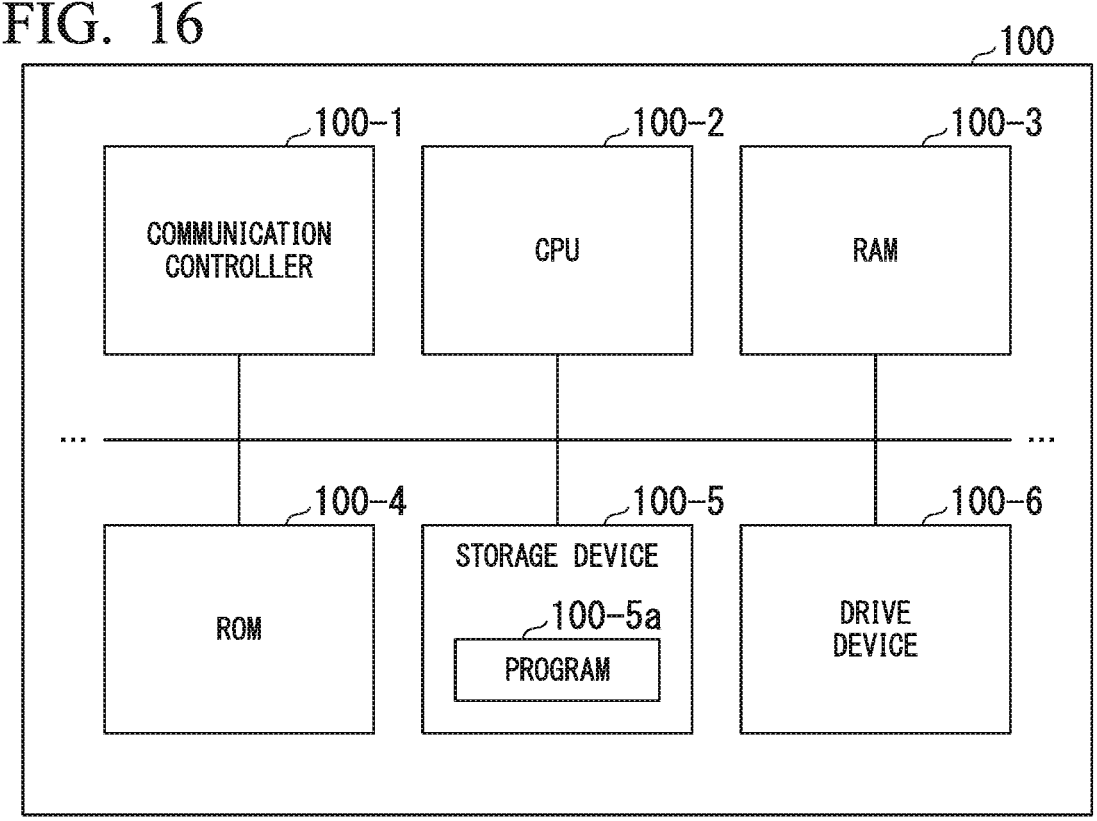
FIG. 16 is a diagram showing an example of a hardware configuration of the vehicle control device according to an embodiment.

The vehicle control device of the embodiments described above is realized, for example, by a hardware configuration as shown in FIG. 16. FIG. 16 is a diagram showing an example of the hardware configuration of the vehicle control device according to an embodiment.

The vehicle control device is configured such that a communication controller 100-1, a CPU 100-2, a RAM 100-3, a ROM 100-4, a secondary storage device 100-5 such as a flash memory or an HDD, and a drive device 100-6 are connected to each other via an internal bus or a dedicated communication line. A portable storage medium such as an optical disc is mounted in the drive device 100-6. A program 100-5a stored in the secondary storage device 100-5 is loaded in the RAM 100-3 by a direct memory access (DMA) controller (not shown) or the like and then executed by the CPU 100-2, thereby realizing the vehicle control device. The program referred to by the CPU 100-2 may be stored in the portable storage medium mounted in the drive device 100-6 or may be downloaded from another device via a network NW.

The embodiments described above can be expressed as follows.

A vehicle control device includes:

a storage device; and a hardware processor configured to execute a program stored in the storage device, wherein, by executing the program, the hardware processor is caused to:

detect a state of an external appearance of an oncoming vehicle facing an own-vehicle in a tunnel on the basis of an image captured by an imaging unit configured to image surroundings of the own-vehicle; and determine whether or not the state of the external appearance of the oncoming vehicle satisfies a predetermined condition on the basis of the detected state of the external appearance of the oncoming vehicle, and determine that the outside of the tunnel toward which the own-vehicle is traveling has bad weather if the state of the external appearance of the oncoming vehicle satisfies the predetermined condition.

Although the modes for carrying out the present invention have been described above by way of embodiments, the present invention is not limited to these embodiments at all and various modifications and substitutions can be made without departing from the gist of the present invention.

For example, when the determiner 146 has determined that the weather is bad on the opposite side of the exit of the tunnel, the bad weather controller 151 may output this fact through the HMI 30 and notify the occupant of this fact. When the determiner 146 has determined that the weather is bad on the opposite side of the exit of the tunnel, the bad weather controller 151 may also output this fact through the HMI 30 and notify the occupant of this fact before stopping automated driving control or driving support control. Thus, the driver can prepare for manual driving. The driver can also see the reason for deceleration of the own-vehicle M.

The detector described in the claims includes, for example, the state detector 144 and may further include at least one of the camera 10, the radar device 12, the finder 14, and the object recognition device 16.

What is claimed is:

1. A vehicle control device comprising:
    a detector configured to detect a state of an oncoming vehicle facing an own-vehicle and a state of a road surface in an oncoming lane in which the oncoming vehicle is present based on an image captured by a camera attached to the own-vehicle; and
    a determiner configured to determine that an outside of a tunnel toward which the own-vehicle is traveling has bad weather if the detector detects that a wiper of the oncoming vehicle is operating and that the road surface of the oncoming lane is wet while the own-vehicle is traveling in the tunnel.

2. The vehicle control device according to claim 1, wherein the determiner is configured to determine that the outside of the tunnel toward which the own-vehicle is traveling has bad weather if the detector detects that snow is attached to the oncoming vehicle.

3. The vehicle control device according to claim 1, wherein the determiner is configured to compare a luminance value of an image captured near an entrance of the tunnel by the imaging unit and a luminance value of an image captured near an exit of the tunnel by the imaging unit and to determine that the outside of the tunnel toward which the own-vehicle is traveling has bad weather on the basis of a result of the comparison.

4. The vehicle control device according to claim 1, further comprising a driving controller configured to control one or both of steering or acceleration/deceleration of the own-vehicle,
    wherein the driving controller is configured to stop control if the determiner determines that the outside of the tunnel toward which the own-vehicle is traveling has bad weather.

5. The vehicle control device according to claim 1, further comprising a driving controller configured to control one or both of steering or acceleration/deceleration of the own-vehicle,
    wherein the driving controller is configured to decelerate the own-vehicle if the determiner determines that the outside of the tunnel toward which the own-vehicle is traveling has bad weather.

6. A vehicle control method performed by an in-vehicle computer mounted in an own-vehicle, the vehicle control method comprising:
    the in-vehicle computer detecting a state of an oncoming vehicle facing the own-vehicle and a state of a road surface in an oncoming lane in which the oncoming vehicle is present based on an image captured by a camera attached to the own-vehicle; and
    determining that an outside of a tunnel toward which the own-vehicle is traveling has bad weather in response to detecting that a wiper of the oncoming vehicle is operating and that the road surface of the oncoming lane is wet while the own-vehicle is in the tunnel.

7. A computer readable non-transitory storage medium storing a program causing an in-vehicle computer mounted in an own-vehicle having an imaging unit configured to image surroundings of the own-vehicle to:
    detect a state of an oncoming vehicle facing the own-vehicle and a state of a road surface in an oncoming lane in which the oncoming vehicle is present based on an image captured by a camera attached to the own-vehicle; and
    determine that an outside of a tunnel toward which the own-vehicle is traveling has bad weather in response to detecting that a wiper of the oncoming vehicle is operating and that the road surface of the oncoming lane is wet while the own-vehicle is in the tunnel.

* * * * *